(12) United States Patent
Yamazaki et al.

(10) Patent No.: US 9,802,602 B2
(45) Date of Patent: Oct. 31, 2017

(54) METHODS AND SYSTEM FOR MITIGATING ENGINE AND MOTOR TORQUE DISTURBANCES OF A HYBRID VEHICLE

(71) Applicant: Ford Global Technologies, LLC, Dearborn, MI (US)

(72) Inventors: Mark Steven Yamazaki, Canton, MI (US); Scott James Thompson, Canton, MI (US); Rajit Johri, Canton, MI (US); Xiaoyong Wang, Novi, MI (US); Jason Meyer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 14 days.

(21) Appl. No.: 14/991,659

(22) Filed: Jan. 8, 2016

(65) Prior Publication Data

US 2017/0197607 A1   Jul. 13, 2017

(51) Int. Cl.
| | |
|---|---|
| *B60W 10/06* | (2006.01) |
| *B60W 20/10* | (2016.01) |
| *B60W 10/08* | (2006.01) |
| *G06F 19/00* | (2011.01) |

(52) U.S. Cl.
CPC .......... *B60W 20/10* (2013.01); *B60W 10/06* (2013.01); *B60W 10/08* (2013.01); *B60W 2540/10* (2013.01); *B60W 2710/02* (2013.01); *Y10S 903/905* (2013.01); *Y10S 903/906* (2013.01); *Y10S 903/912* (2013.01)

(58) Field of Classification Search
CPC ...... B60W 20/20; B60W 10/06; B60W 10/08; Y10S 903/905; Y10S 903/906; Y10S 903/912; G06F 19/00

USPC ........................ 701/22, 51, 67; 477/5, 107
See application file for complete search history.

(56) References Cited

U.S. PATENT DOCUMENTS

| | | | | |
|---|---|---|---|---|
| 6,203,468 | B1 * | 3/2001 | Nitta .................... | B60W 10/02 477/107 |
| 6,217,479 | B1 * | 4/2001 | Brown .................... | F16H 3/66 475/207 |
| 8,538,643 | B1 | 9/2013 | Wang et al. | |
| 8,731,753 | B2 | 5/2014 | Smith et al. | |
| 9,340,200 | B2 * | 5/2016 | Dufford ............... | B60W 10/06 |
| 2003/0184152 | A1 * | 10/2003 | Cikanek ................. | B60K 6/48 303/152 |
| 2008/0306643 | A1 * | 12/2008 | Hanyu .................... | B60K 6/48 701/22 |
| 2012/0083385 | A1 * | 4/2012 | Smith ................... | B60K 6/442 477/5 |

(Continued)

OTHER PUBLICATIONS

Wang, Xiaoyong, et al., "Methods and Systems for Starting an Engine," U.S. Appl. No. 14/472,222, filed Aug. 28, 2014, 42 pages.

*Primary Examiner* — Tan Q Nguyen
(74) *Attorney, Agent, or Firm* — David Kelley; McCoy Russell LLP (57) ABSTRACT

Systems and methods for operating a transmission of a hybrid powertrain that includes a motor/generator are described. The systems and methods may improve engine starting during engine starts where little or larger driver demand torques are requested. In one example, engine torque may be commanded to a torque based on a filtered driver demand torque, the filtered driver demand torque filtered based on a position of an accelerator pedal.

19 Claims, 7 Drawing Sheets

(56) References Cited

U.S. PATENT DOCUMENTS

2015/0025724 A1 1/2015 Yamazaki et al.
2015/0239467 A1 8/2015 Wang et al.

* cited by examiner

METHODS AND SYSTEM FOR MITIGATING ENGINE AND MOTOR TORQUE DISTURBANCES OF A HYBRID VEHICLE

FIELD

The present description relates to methods and a system for operating a powertrain of a hybrid vehicle. The methods and systems may be particularly useful for hybrid vehicles that provide wheel torque via an engine and motor that are positioned along a shaft providing input to a transmission.

BACKGROUND AND SUMMARY

A hybrid vehicle may include an engine and a motor along a length of a driveline shaft that provides torque to a transmission. The engine may be selectively coupled to the motor via a driveline disconnect clutch so that the engine and motor may be operated separately or together to provide a desired driver demand torque. The motor may provide relatively small amounts of torque to drive vehicle wheels, or it may be operated as a generator to recharge an electric energy storage device. The engine may be activated to supply larger amounts of torque to vehicle wheels or to recharge the electric energy storage device via the motor operating as a generator. If the engine torque is increased and motor is decreased simultaneously to provide a driver demand torque over a short period of time, the engine torque may not increase at a same rate as the motor torque decreases, thereby causing a driveline torque disturbance. For example, a vehicle system controller may command an engine torque and a motor torque at a same time. The engine torque demand may be transmitted from the vehicle system controller to an engine controller and the motor torque demand may be transmitted from the vehicle system controller to a motor torque controller. Because the engine controller may receive its instructions at a different time than the motor controller due to communication network delays, the engine torque increase may not be compensated by the motor torque decrease. In addition, even if engine torque commands and motor torque commands were processed identically, engine torque production and motor torque production may vary due to response times of engine torque actuators and engine torque production being different than those of a motor. Consequently, a phase difference between the engine torque and the motor torque may develop, which may result in driveline torque disturbances that are objectionable to the vehicle's driver.

The inventors herein have recognized the above-mentioned issues and have developed a powertrain operating method, comprising: during engine run-up from cranking speed to a desired speed before a driveline disconnect clutch coupled to an engine is fully closed, commanding an engine torque to first torque bounded by a lower limit and an upper limit, the lower limit and the upper limit based on an accelerator pedal position.

By controlling engine torque limits during engine run-up from cranking speed to a desired speed and shortly thereafter in response to accelerator pedal position, it may be possible to provide a smooth progression of driveline torque during conditions where a driver expects the same. Additionally, during conditions of high driver demand where a driver reasonably expects a rapid change in torque production, the torque limits may be increased to improve driveline torque response. For example, when a driver is requesting a small amount of torque and the engine is started, a commanded engine torque may be heavily filtered so that engine torque and motor torque change slowly over time so as to reduce the possibility of disturbing the driver. Conversely, when a driver is requesting a larger amount of torque, commanded engine torque may be filtered less so that driveline torque response may be improved. In this way, engine torque and motor torque may be adjusted during engine starting and shortly thereafter to reduce the possibility of driveline torque disturbances.

The present description may provide several advantages. For example, the approach may provide reduce the possibility of producing driveline torque disturbances that may be objectionable to a driver. Further, the approach may provide a smooth transition between delivering all driver demand torque via a motor to delivering driver demand torque via the motor and an engine. Additionally, the approach may provide different torque limits during different engine starting phases so that the torque limits are appropriate for the requested maneuver.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
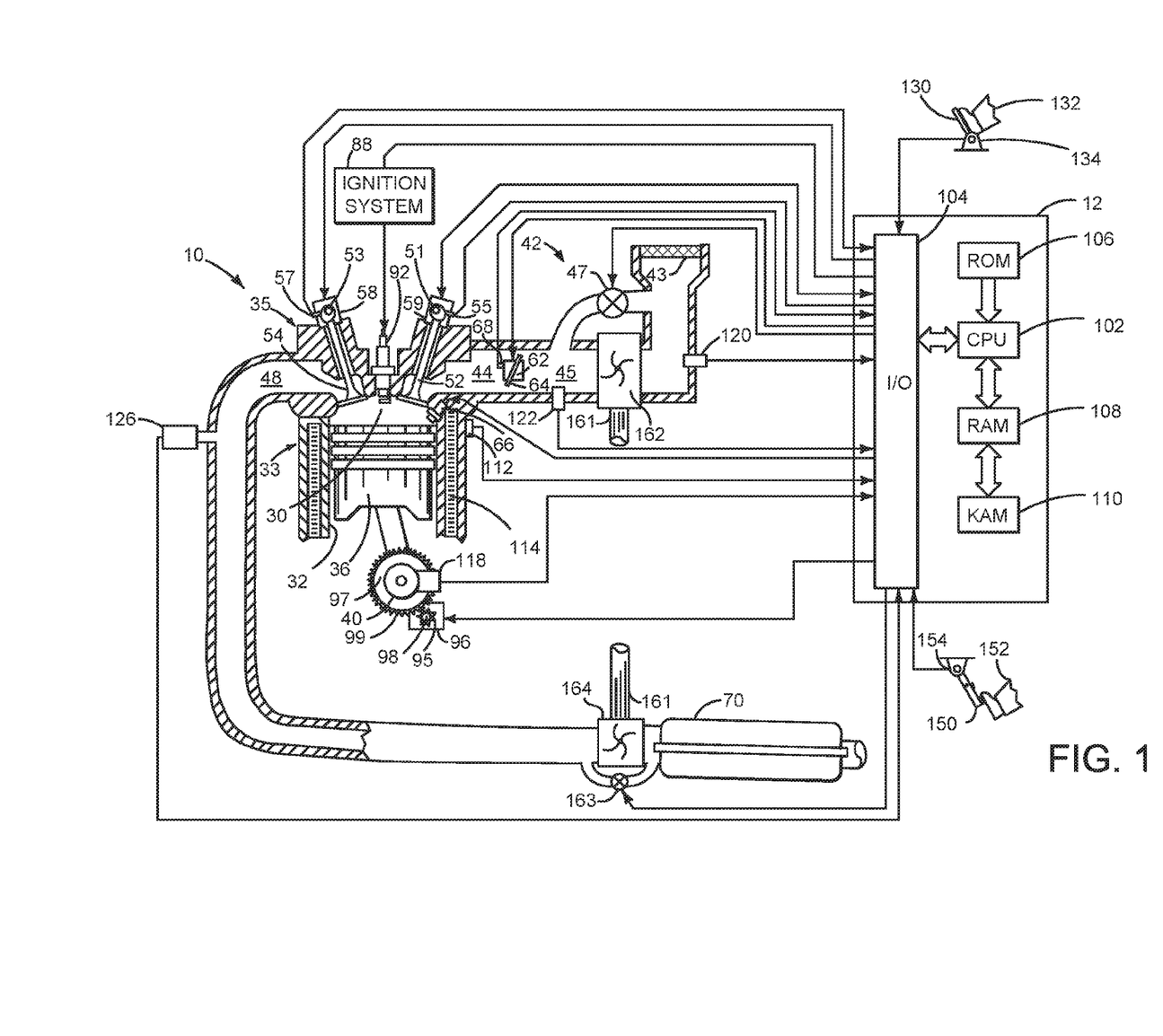
FIG. 1 is a schematic diagram of an engine.
Figure 2:
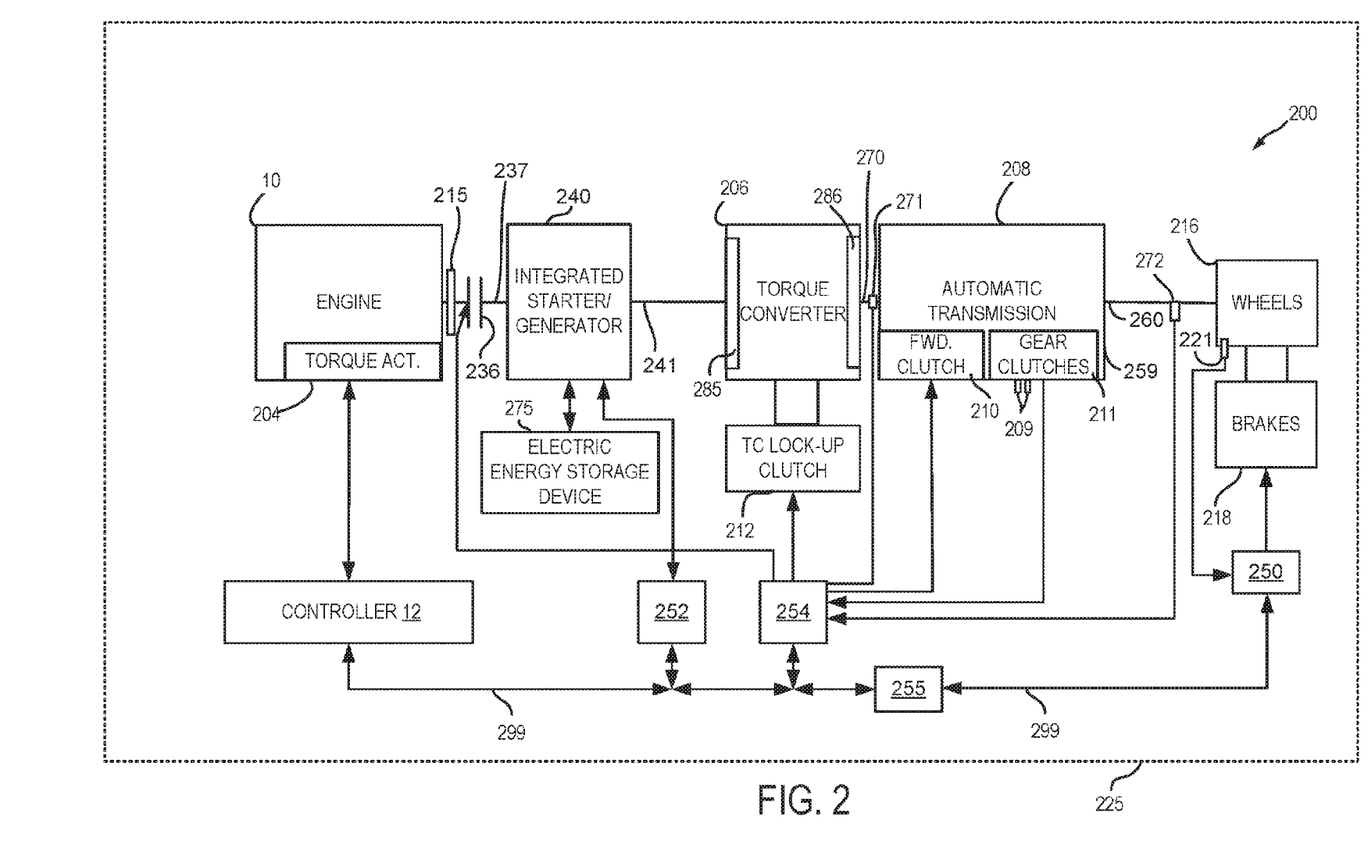
FIG. 2 is a schematic diagram of a hybrid vehicle powertrain.

The present description is related to providing a desirable driveline torque progression. The hybrid vehicle may include an engine as is shown in FIG. 1. The engine of FIG. 1 may be included in a powertrain as is shown in FIG. 2. The powertrain may include an engine that is started according to the engine starting sequences shown in FIGS. 3 and 4. A block diagram of an example engine and motor torque controller according to the present disclosure is shown in FIG. 5. FIG. 6 is a flowchart of a method for commanding engine and motor torque. A plot showing an example time constant that is a function of accelerator pedal position is shown in FIG. 7.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), sensor and actuator data, diagnostic information (e.g., information regarding a degraded transmission, information regarding a degraded engine, information regarding a degraded electric machine, information regarding degraded brakes). Further, the vehicle system controller may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque to provide a desired rate of vehicle deceleration. The desired wheel torque may be provided by vehicle system controller requesting a first braking torque from electric machine controller 252 and a second braking torque from brake controller 250, the first and second torques providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250.

In this example, powertrain 200 may be powered by engine 10 and electric machine 240. In other examples, engine 10 may be omitted. Engine 10 may be started with an engine starting system shown in FIG. 1 or via integrated starter/generator (ISG) 240. ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input or first side of powertrain disconnect clutch 236 through dual mass flywheel 215. Disconnect clutch 236 may be electrically or hydraulically actuated. The downstream or second side of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 has a higher output torque capacity than starter 96 shown in FIG. 1. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque from an accelerator pedal or other device. Vehicle system controller 255 then allocates a fraction of the requested driver demand torque to the engine and the remaining fraction to the ISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271. Transmission controller 254 may receive transmission output shaft torque from torque sensor 272. Alternatively, sensor 272 may be a position sensor or torque and position sensors. If sensor 272 is a position sensor, controller 254 differentiates a position signal to determine transmission output shaft velocity. Transmission controller 254 may also differentiate transmission output shaft velocity to determine transmission output shaft acceleration.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

The system of FIGS. 1 and 2 provides for a system, comprising: an engine; a motor/generator; a disconnect clutch positioned in a powertrain between the engine and the motor; a transmission coupled to the motor/generator; and a controller including executable instructions stored in non-transitory memory for commanding an engine torque and a motor torque during engine starting to a time when motor torque is zero or less than zero and engine torque is equal to or greater than a driver demand torque, the engine torque commanded based on a rate filtered driver demand torque that reduces a rate of engine torque increase for accelerator pedal positions less than a threshold and increases the rate of engine torque increase for accelerator pedal positions greater than the threshold.

The system includes where the engine torque is commanded based on the rate filtered driver demand torque only after starting to close the driveline disconnect clutch. The system further comprises additional instructions to command motor torque to provide the driver demand torque during engine cranking and run-up to motor speed. The system further comprises additional instructions to command motor torque to zero or less than zero in response to fully closing the driveline disconnect clutch. The system further comprises additional instructions to estimate engine torque based on engine speed and engine load. The system further comprises additional instructions to adjust motor torque based on the estimate of engine torque.

Figure 3:
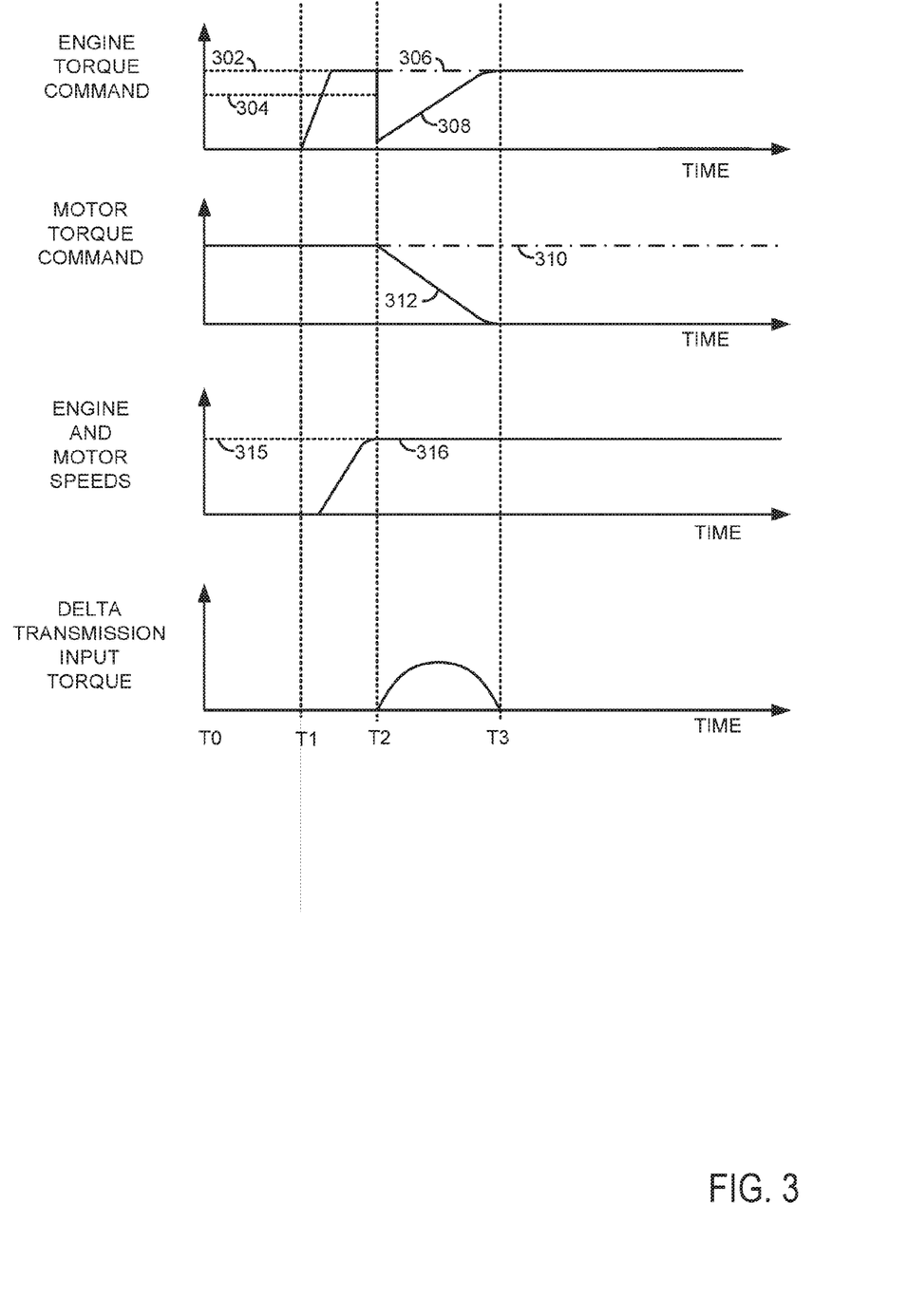
FIGS. 3-4 show two different example engine starting sequences.

Referring now to FIG. 3, an example sequence performed according to the method of FIG. 6 and the block diagram of FIG. 5 is shown. The sequence of FIG. 3 may be provided by the system of FIGS. 1 and 2. The various plots of FIG. 3 are time aligned and occur at a same time. Vertical lines at times T0-T3 represent times of particular interest in the sequence. The prophetic sequence shown in FIG. 3 represents engine starting according when driver demand torque is greater than a threshold value.

The first plot from the top of FIG. 3 is a plot of an engine torque command or commanded engine torque versus time. The vertical axis represents commanded engine torque and commanded engine torque increases in the direction of the vertical axis arrow. The horizontal axis represents time. Time begins on the left side of the figure and increases to the right side of the figure. Dashed line 302 represents a maximum engine torque command limit. Dashed line 304 represents a minimum engine torque command limit. Dash-dot line 306 represents driver demand torque. Solid line 308 represents commanded engine torque.

The second plot from the top of FIG. 3 is a plot of commanded motor torque or motor torque command versus time. The vertical axis represents commanded motor torque and commanded motor torque increases in the direction of the vertical axis arrow. The horizontal axis represents time. Time begins on the left side of the figure and increases to the right side of the figure. Dash-dot line 310 represents driver demand torque. Solid line 312 represents commanded motor torque.

The third plot from the top of FIG. 3 is a plot of engine and motor speeds versus time. The vertical axis represents engine and motor speed and engine and motor speed increase in the direction of the vertical axis arrow. The horizontal axis represents time. Time begins on the left side of the figure and increases to the right side of the figure. Dash line 315 represents motor speed. Solid line 316 represents engine speed.

The fourth plot from the top of FIG. 3 is a plot of delta transmission input shaft torque (e.g., desired transmission input shaft torque minus actual transmission input shaft torque) versus time. The vertical axis represents delta transmission input shaft torque and delta transmission input shaft torque increases in a direction of the vertical axis arrow below the horizontal axis. The horizontal axis represents time. Time begins on the left side of the figure and increases to the right side of the figure.

At time T0, the engine torque command is zero since the engine is stopped and an engine start is not requested. The maximum and minimum commanded engine torque limits are shown at constant levels that are based on accelerator pedal position. Accelerator pedal position is related to driver demand torque. The driver demand torque is at a same level as the maximum engine torque limit for engine run-up, but it is not shown so that the maximum commanded engine torque limit for engine run-up is unobstructed. The commanded motor torque is equal to the driver demand torque, and the motor speed is greater than zero and it is at an elevated speed. The delta transmission torque is zero since the motor provides the driver demand torque. In this example, the driver demand torque is equivalent to the desired transmission input shaft torque, but the driver demand torque may be a wheel torque or torque at another transmission location. Further, the driver demand torque may be converted from a wheel torque to a transmission input shaft torque via multiplying the wheel torque by the transmission gear ratio and axle ratio.

At time T1, the engine is requested to be started. The engine may be started in response to a low state of battery charge or other condition. The engine torque command is increased to the maximum engine run-up torque limit, which is a same level as the driver demand torque in this example. The motor torque demand is equivalent to the driver demand torque and the delta transmission input shaft torque is zero.

Between time T1 and time T2, the engine torque reaches the maximum commanded engine torque limit and the motor speed accelerates toward the motor speed. The motor torque remains equivalent to the maximum commanded engine torque limit and the delta transmission input shaft torque is zero.

At time T2, the engine speed is within a threshold speed of motor speed and the driveline disconnect clutch is commanded closed (not shown). The engine torque is reduced in response to closing the driveline disconnect clutch. The engine torque may be reduced via retarding spark timing and/or reducing air flow into the engine. The motor torque command begins to decrease in response to starting to close the driveline disconnect clutch and the delta transmission input shaft torque begins to increase as the driveline disconnect clutch is closed.

Between time T2 and time T3, the engine torque command is increased and the motor torque is decreased. The engine torque command approaches the driver demand torque and motor torque approaches zero. The engine torque command increases at a relatively high rate and the motor torque decreases at a relatively high rate so that the transmission input shaft torque meets the driver demand torque. However, engine torque and motor torque may not exactly meet the driver demand torque when large changes in torque are made in a short period of time. Consequently, the delta transmission input shaft torque increases and then decreases.

At time T3, the engine torque command equals the driver demand torque and the motor torque is zero. However, in other examples, the engine torque command plus the motor torque command may provide the driver demand torque. Thus, the motor torque may not be zero, but may be positive or negative after the driveline disconnect clutch is closed.

Figure 4:
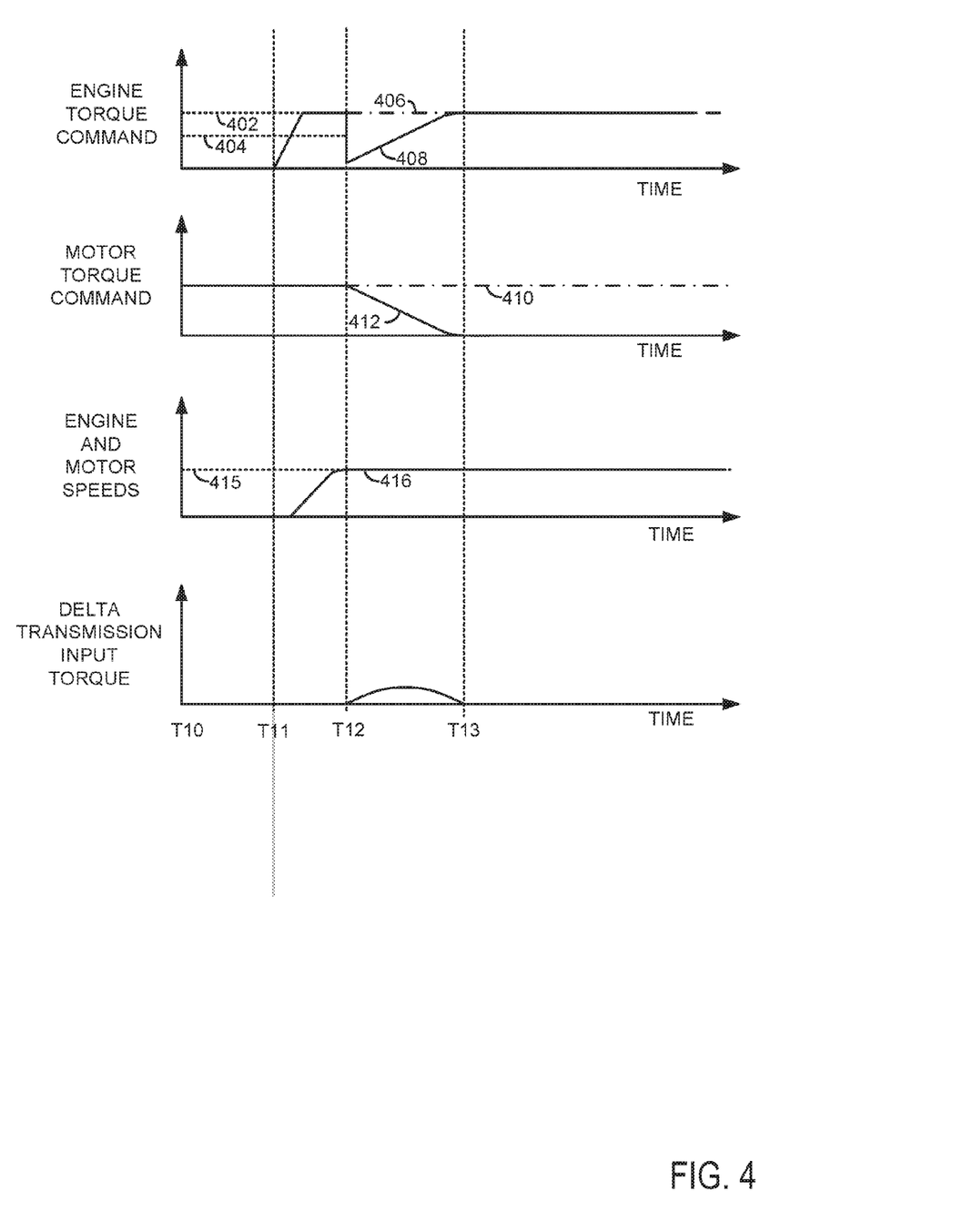
Figure 5:
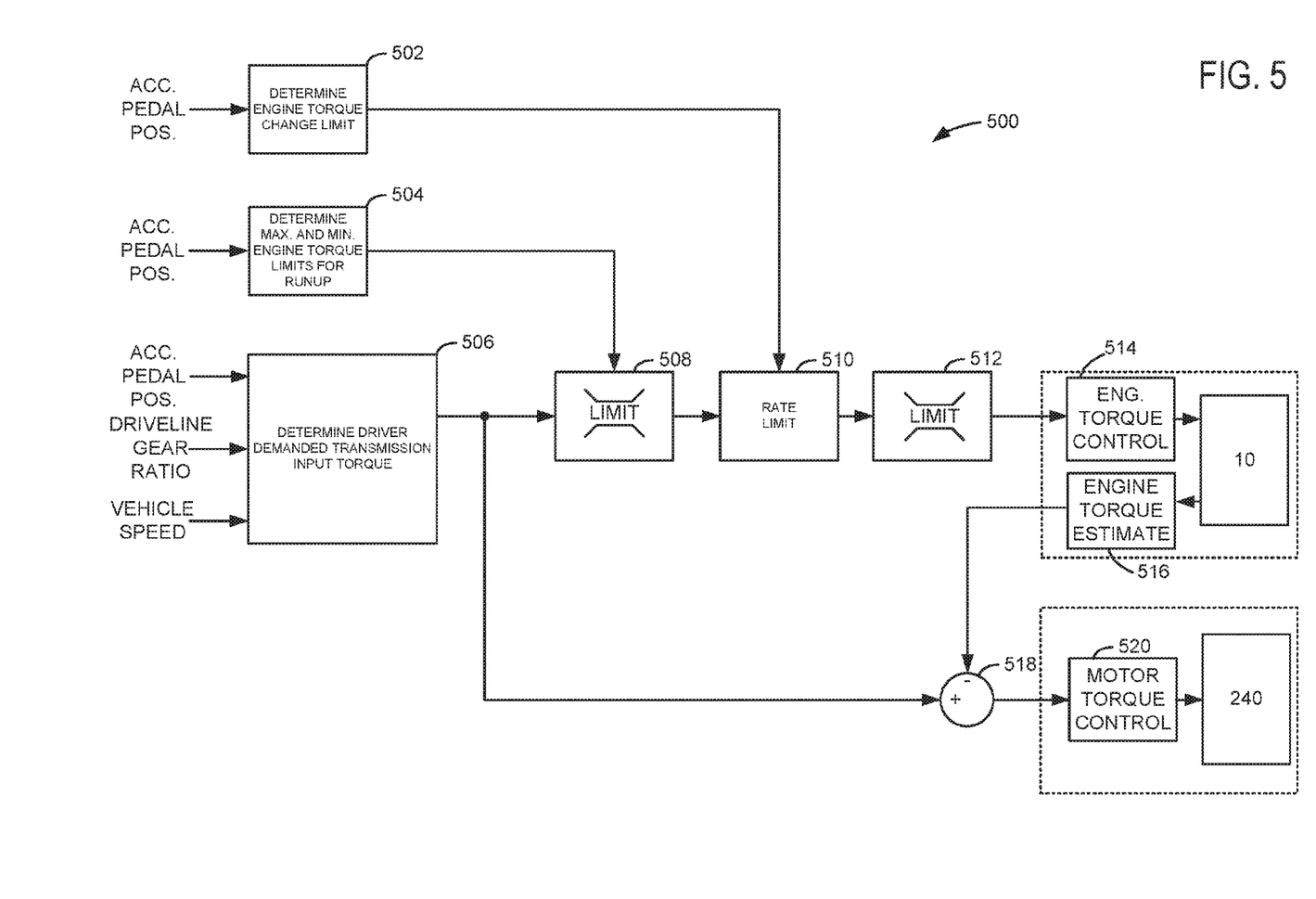
FIG. 5 shows an example block diagram for controlling engine and motor torque.
Figure 6:
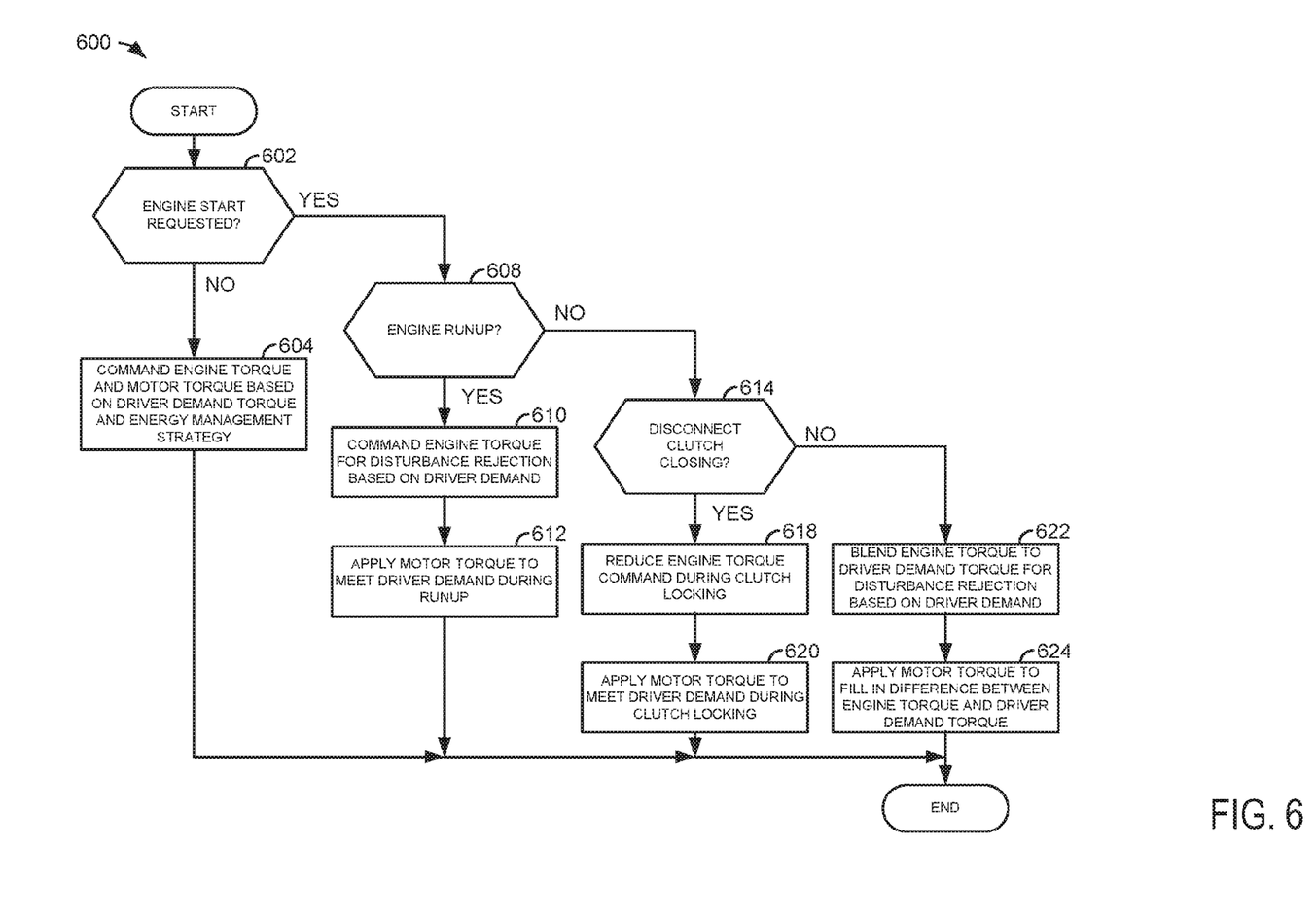
FIG. 6 shows an example flowchart for controlling engine and motor torque.
Figure 7:
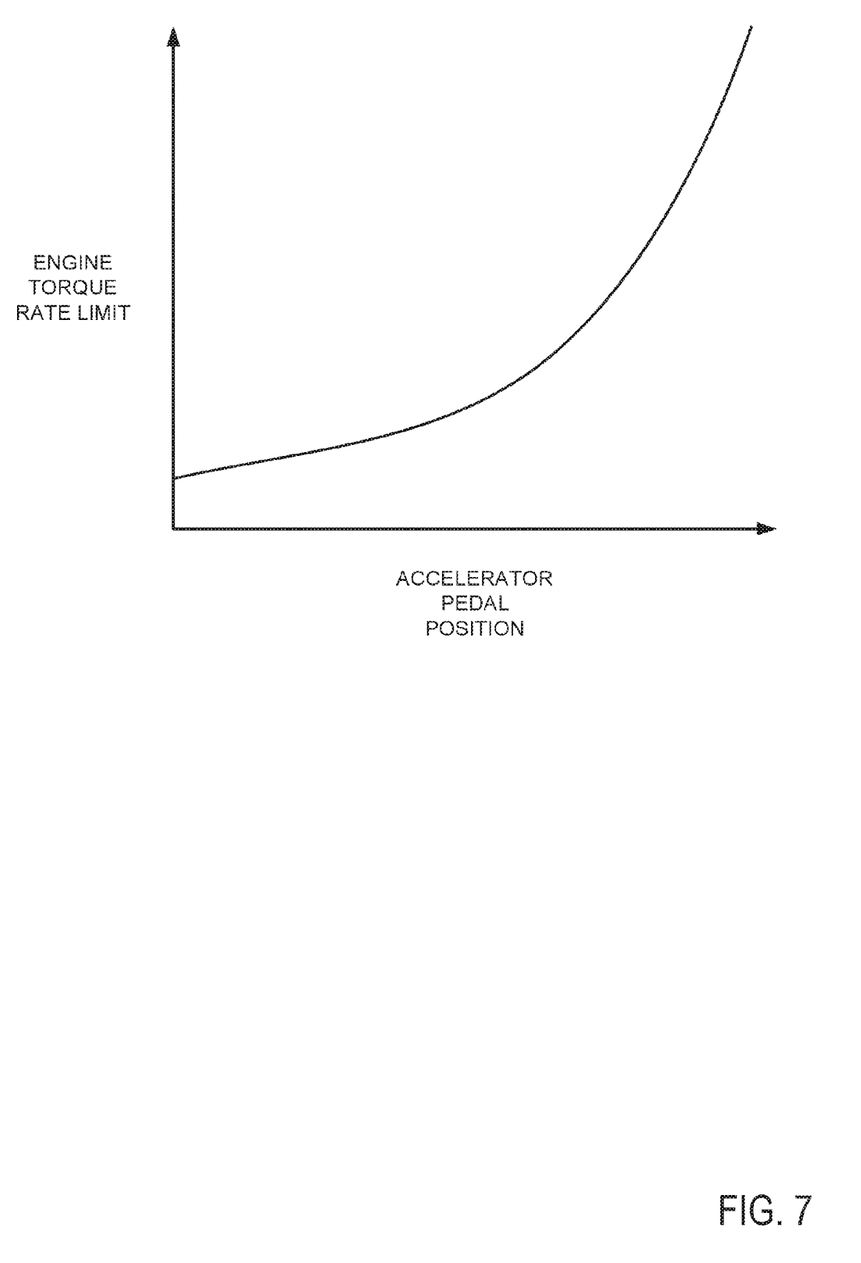
FIG. 7 shows an example filter time constant based on accelerator pedal position used for a commanding engine torque.

Referring now to FIG. 4, an example sequence performed according to the method of FIG. 6 and the block diagram of FIG. 5 is shown. The sequence of FIG. 4 may be provided by the system of FIGS. 1 and 2. The various plots of FIG. 3 are time aligned and occur at a same time. Vertical lines at times T10-T13 represent times of particular interest in the sequence. The prophetic sequence shown in FIG. 4 represents engine starting according when driver demand torque is greater than a threshold value.

The first plot from the top of FIG. 4 is a plot of an engine torque command or commanded engine torque versus time. The vertical axis represents commanded engine torque and commanded engine torque increases in the direction of the vertical axis arrow. The horizontal axis represents time. Time begins on the left side of the figure and increases to the right side of the figure. Dashed line 402 represents a maximum engine torque command for engine run-up (e.g., time that the engine accelerates between engine cranking speed and a desired speed such as engine idle speed or motor speed). Dashed line 404 represents a minimum engine torque command during engine run-up. Dash-dot line 406 represents driver demand torque. Solid line 408 represents commanded engine torque.

The second plot from the top of FIG. 4 is a plot of commanded motor torque or motor torque command versus time. The vertical axis represents commanded motor torque and commanded motor torque increases in the direction of the vertical axis arrow. The horizontal axis represents time. Time begins on the left side of the figure and increases to the right side of the figure. Dash-dot line 410 represents driver demand torque. Solid line 412 represents commanded motor torque.

The third plot from the top of FIG. 4 is a plot of engine and motor speeds versus time. The vertical axis represents engine and motor speed and engine and motor speed increase in the direction of the vertical axis arrow. The horizontal axis represents time. Time begins on the left side of the figure and increases to the right side of the figure. Dash line 415 represents motor speed. Solid line 416 represents engine speed.

The fourth plot from the top of FIG. 4 is a plot of delta transmission input shaft torque (e.g., desired transmission input shaft torque minus actual transmission input shaft torque) versus time. The vertical axis represents delta transmission input shaft torque and delta transmission input shaft torque increases in a direction of the vertical axis arrow below the horizontal axis. The horizontal axis represents time. Time begins on the left side of the figure and increases to the right side of the figure.

At time T10, the engine torque command is zero since the engine is stopped and an engine start is not requested. The maximum and minimum commanded engine torque limits during engine run-up are shown at constant levels that are based on accelerator pedal position. The driver demand torque is at a same level as the maximum engine torque limits for engine run-up, but it is not shown so that maximum commanded engine torque limit for engine run-up is unobstructed. The commanded motor torque is equal to the driver demand torque, and the motor speed is greater than zero and it is at an elevated speed. The delta transmission torque is zero since the motor provides the driver demand torque. In this example, the driver demand torque is equivalent to the desired transmission input shaft torque, but the driver demand torque may be a wheel torque or torque at another transmission location. In this example, the driver demand torque and accelerator pedal position (not shown) are less than the driver demand torque for the example shown in FIG. 3.

At time T11, the engine is requested to be started. The engine torque command is increased to the maximum engine run-up torque limit at a reduced rate of change as compared to the rate of engine torque increase shown in FIG. 3. The engine torque limit for engine run-up is at the driver demand torque in this example. The motor torque demand is equivalent to the driver demand torque and the delta transmission input shaft torque is zero. By lowering the maximum engine run-up torque limit and reducing the rate of engine torque change, it takes more time to increase engine torque from zero to the driver demand torque as compared to when driver demand is greater as shown in FIG. 3. In this way, the progression of engine torque and motor torque may be slowed so that driveline torque disturbances may be less noticeable.

Between time T11 and time T12, the engine torque reaches the maximum commanded engine torque limit for engine run-up and the motor speed accelerates toward the motor speed. The motor torque remains equivalent to the maximum commanded engine torque limit for engine run-up and the delta transmission input shaft torque is zero.

At time T12, the engine speed is within a threshold speed of motor speed and the driveline disconnect clutch is commanded closed. The engine torque is reduced in response to closing the driveline disconnect clutch. The engine torque may be reduced via retarding spark timing and/or reducing air flow into the engine. The motor torque command begins to decrease in response to starting to close the driveline disconnect clutch and the delta transmission input shaft torque begins to increase as the driveline disconnect clutch is closed.

Between time T12 and time T13, the engine torque command is increased and the motor torque is decreased. The engine torque command approaches the driver demand torque, which is greater than the maximum engine torque command limit for engine run-up, and motor torque approaches zero. The engine torque command increases at a slower rate than the rate the engine torque increases between time T2 and time T3 shown in FIG. 3. Additionally, the motor torque decreases at a slower rate than the rate the motor torque decreases between time T2 and time T3 shown in FIG. 3. By reducing the rate of engine torque increase and motor torque decrease, driveline torque error may be less noticeable to a driver. Consequently, the delta transmission input shaft torque increases may be reduced as compared to during conditions where engine torque is increased quickly as is shown in FIG. 3.

At time T13, the engine torque command equals the driver demand torque and the motor torque is zero. However, in other examples, the engine torque command plus the motor torque command may provide the driver demand torque. Thus, the motor torque may not be zero, but may be positive or negative after the driveline disconnect clutch is closed.

In this way, the engine torque command limits may be adjusted responsive to accelerator pedal position so that driveline torque disturbances may be reduced at lower driver demand torques. Further, as shown in FIG. 3, driveline torque disturbances may be allowed to increase during higher driver demand torque conditions to improve driveline torque response (e.g., to provide greater torque to the driveline in a shorter period of time).

Referring now to FIG. 5, a control block diagram for adjusting engine torque and motor torque is shown. The block diagram of FIG. 5 and/or the flowchart of FIG. 6 may be a basis for commanding engine torque and motor torque of a hybrid vehicle that includes an engine and a motor. The block diagram of FIG. 5 and the flowchart of FIG. 6 may be implemented as executable controller instructions stored in non-transitory memory. Additionally, portions of block diagram 500 and method 600 may be actions taken in the physical world to transform an operating state of an actuator or device.

At 502, accelerator pedal position is used as a basis for determining a desired rate of change limit in the commanded engine torque after the driveline disconnect clutch begins to close. The engine torque command and motor torque command are blended together (e.g., added) to provide the desired driver demand torque after the driveline disconnect clutch begins to close. In one example, the rate of change limit in commanded engine torque is limited based on accelerator pedal position. For example, accelerator pedal position is the basis for indexing a table or function and the output of the table or function is a maximum rate of change limit for the commanded engine torque per unit time (e.g., 100 N-m/second). The values of the maximum engine rate of change torque limit in the table or function may be empirically determined. Additionally, in some examples, accelerator pedal position may be the basis for indexing a table or function that outputs a time constant or parameters for a known filter (e.g., a time constant for a low pass filter, filter cut off frequency, pass band, etc.). The parameters may then be applied to the filter, and the filter may be applied to the transmission input torque command, which is partitioned into a motor torque command and an engine torque command during engine and motor torque blending. The maximum rate of change for commanded engine torque and/or the filter parameters are delivered to block 510.

At 504, accelerator pedal position is used as a basis for determining a maximum and minimum commanded engine torque limits during engine run-up. In one example, the maximum and minimum commanded engine torque limits are based on accelerator pedal position. For example, accelerator pedal position is the basis for indexing a table or function, and the output of the table or function is a maximum engine torque command limit during engine run-up and a minimum engine torque command limit during engine run-up. The values of the maximum and minimum commanded engine torque limits during engine run-up in the table or function may be empirically determined. The maximum and minimum commanded engine torque limits during engine run-up are delivered to block 508.

At block 506, control block diagram determines a desired transmission input shaft torque. Accelerator pedal position, vehicle speed, and presently activated transmission gear ratio are the basis for determining the desired transmission input shaft torque. In one example, accelerator pedal position and vehicle speed index a table that outputs a desired wheel torque. The desired wheel torque values in the table or function may be empirically determined. The wheel torque is converted to a desired transmission input shaft torque by multiplying the desired wheel torque by the presently selected transmission gear ratio and an axle ratio. The desired transmission input shaft torque is delivered to block 508 and summing junction 518.

At 508, the maximum and minimum commanded engine torque limits during engine run-up are applied to the desired transmission input shaft torque. For example, if the desired transmission input shaft torque is greater than the maximum commanded engine torque limit, block 508 outputs the maximum commanded engine torque limit as commanded engine torque to block 510. If the desired transmission input shaft torque is less than the maximum commanded engine torque limit, block 508 outputs the minimum commanded engine torque limit as commanded engine torque to block 510. If the desired transmission input shaft torque is between than the maximum commanded engine torque limit and the minimum commanded engine torque limit, block 508 outputs the desired transmission input shaft torque to block 510 as commanded engine torque. If the engine is not being run-up, the desired transmission input shaft torque is passed to block 510 unchanged in value, but as commanded engine torque.

At 510, the desired rate of change limit and or filter parameters determined at 502 are the basis for filtering the commanded engine torque. For example, if the desired maximum engine rate of change torque limit is 50 N-m/second and the commanded engine torque changes by 65 N-m/second, the engine torque command passed from block 510 to block 512 is limited to a rate of change of 50 N-m/second. If the if the desired maximum engine rate of change torque limit is 50 N-m/second and the commanded engine torque changes by 25 N-m/second, the engine torque command passes unchanged from block 510 to block 512. Additionally, a low pass, high pass, band pass, infinite impulse response filter or other known filter may be applied to the commanded engine torque at block 510 and commanded engine torque is output to block 512.

At block 512, the commanded engine torque is limited based on engine subsystem limits. Engine subsystem limits may include but are not limited to limiting commanded engine torque based on engine speed, engine temperature, ambient temperature, and type of fuel supplied to the engine. For example, the engine torque command may be limited to 100 N-m when engine speed is less than 1200 RPM. Further, the engine torque command may be limited to a maximum torque of 300 N-m when low octane fuel is supplied to the engine. Block 512 directs the engine torque command to bock 514 after engine subsystem limits are applied to the engine torque command.

At block 514, the engine torque command is applied to engine 10 to produce the commanded or desired engine torque. The engine torque command may be applied to engine 10 via controller 12 and the various actuators shown in FIG. 1. For example, the engine torque command may increase or decrease the throttle position so as to increase or decrease air flow to the engine. Similarly, the engine torque command may increase or decrease the amount of fuel supplied to the engine so that the engine may provide the commanded engine torque. The engine torque command is applied to engine 10.

At block 516, engine torque is estimated from engine speed, air flow into the engine, and engine spark timing. In one example, engine speed, air flow into the engine, and engine spark timing are used to index a table that outputs empirically determined values of engine torque to block 518. In other examples, more complex engine torque models output estimated engine torque to block 518.

At 518, the estimated engine torque is subtracted from the desired transmission input shaft torque. The result is the commanded motor torque. Thus, the commanded engine torque and commanded motor torque sum to the desired transmission input shaft torque or the driver demand torque. The commanded motor torque is directed to block 520.

At 520, the motor torque command may be applied to the motor via electric machine controller 252. The motor torque may be increased or decreased via adjusting an amount of current supplied to the motor.

Referring now to FIG. 6, a method for operating a vehicle powertrain is shown. At least portions of method 600 may be implemented as executable controller instructions stored in non-transitory memory. Additionally, portions of method 600 may be actions taken in the physical world to transform an operating state of an actuator or device.

At 602, method 600 judges if an engine start is requested. An engine start may be initiated based on an amount of driver demand torque, battery state of charge, or other vehicle operating condition. If method 600 judges that an engine start is requested, method 600 proceeds to 608. Otherwise, method 600 proceeds to 604.

At 604, method 600 commands engine torque and motor torque based on output of an energy management strategy. In one example, the energy management strategy commands engine torque based on driver demand torque, vehicle speed, and battery state of charge. Additionally, other conditions may also be the basis for commanding engine torque and motor torque according to the energy management strategy. In one example, driver demand torque indexes a table or function that describes brake specific fuel consumption (BFSC) for the engine. If the vehicle is operating at conditions where engine BFSC is less than a threshold without operating the motor, the driver demand torque is provided by the engine. If the vehicle is operating at conditions where the engine would operate at less than a threshold BFSC without operating the motor, a portion of the driver demand torque may be provided by the engine and the remaining amount of torque may be provided by the motor. The engine and motor torque commands are output at 604 and method 600 proceeds to exit.

At 608, method 600 judges if the engine is in run-up (e.g., between cranking speed and a desired engine speed such as idle speed or a speed of the motor). If so, method 600 proceeds to 610. Otherwise, if the engine has completed run-up (e.g., achieved the desired engine speed), method 600 proceeds to 614. The engine is rotated at a low speed or cranked when the engine is not running up. In this way, method 600 may separate engine torque control during engine run-up from engine torque control during cranking or after driveline disconnect clutch closing.

At 610, method 600 commands engine torque for engine run-up based on accelerator pedal position, which is a basis for driver demand torque. In one example, commanded engine torque during engine run-up is based on the following equations:

$$T_{min\_runup} = f(\text{Acc\_ped})$$

$$T_{max\_runup} = \text{Max}\{T_{drv\_dem}, f(\text{Acc\_ped})\}$$

$$T_{eng\_cmd} = T_{drv\_dem} \lim\{T_{min\_runup}, T_{max\_runup}\}$$

where Acc_ped is accelerator pedal position, $f$ denotes a function, $T_{drv\_dem}$ is driver demand torque, $T_{min\_runup}$ is minimum commanded engine torque during engine run-up, $T_{max\_runup}$ is maximum commanded engine torque during engine run-up, and $T_{eng\_cmd}$ is the engine torque command. Max selects and outputs a maximum value from the variable $T_{drv\_dem}$ and the function $f(Acc\_ped)$. Lim applies $T_{min\_runup}$ and $T_{max\_runup}$ limits to the driver demand torque $T_{drv\_dem}$. Thus, $T_{drv\_dem}$ is constrained or held to a value between $T_{min\_runup}$ and $T_{max\_runup}$. Method 600 commands the engine torque to the value $T_{eng\_cmd}$. Engine run-up may occur before the driveline disconnect clutch is fully closed. Method 600 proceeds to 612 after the engine is commanded.

At 612, method 600 commands the motor torque to the driver demand torque. In some examples, the driver demand torque represents a desired transmission input shaft torque. The motor is commanded to the driver demand torque to propel the vehicle as requested by the driver. Method 600 proceeds to exit after adjusting the motor torque.

At 614, method 600 judges if the driveline disconnect clutch has started to close. If so, the answer is yes and method 600 proceeds to 618. If the disconnect clutch has not started to close, method 600 continues to command the engine at the torque determined at 610. If the disconnect clutch is closed, the answer is no and method 600 proceeds to 622. The driveline disconnect clutch is fully closed when driveline disconnect clutch speed on an engine side of the driveline disconnect clutch is a same speed as driveline disconnect clutch speed on a motor side of the driveline disconnect clutch.

At 618, method 600 reduces engine torque during driveline disconnect clutch closing. In one example, the engine torque is reduced to a level based on driveline disconnect clutch torque capacity. For example, engine torque may be commanded to a value greater than or equal to zero. Further, the engine torque may be commanded to a value that is less than the driveline disconnect clutch torque capacity during driveline disconnect clutch closing. In one example, the engine torque may be reduced via retarding spark timing and/or closing the engine throttle. Method 600 proceeds to 620 after reducing engine torque.

At 620, method 600 commands the motor torque to the driver demand torque. The motor is commanded to the driver demand torque to propel the vehicle as requested by the driver. Method 600 proceeds to exit after adjusting the motor torque.

At 622, method 600 filters the driver demand torque to provide the commanded engine torque. In one example, the filter may be a rate limiting function that limits the commanded engine torque to less than a predetermined amount that is based on accelerator pedal position. For example, commanded engine torque may be rate limited to 20 N-m/second for accelerator pedal positions less than 10% of full scale at a particular engine speed. At greater accelerator pedal positions, such as 90% of full scale, commanded engine torque may be rate limited to 200 N-m/second at a particular engine speed. Thus, the commanded engine torque may be rate limited to less than a threshold rate when accelerator pedal position is less than a threshold amount and commanded engine torque may be rate limited to greater than a threshold rate when accelerator pedal position is greater than the threshold amount.

Additionally, or alternatively, the driver demand torque may be filtered via a high pass filter, low pass filter, band pass filter, IIR filter or other known filter. The filter may have a time constant, cut off frequency, or other operational parameter that is based on accelerator pedal position. In one example, a low pass filter may be applied to driver demand torque and a the low pass filter may operate with a longer time constant at smaller accelerator pedal positons (e.g., accelerator pedal position less than a threshold) and a shorter time constant at larger accelerator pedal positions (e.g., accelerator pedal position greater than the threshold). By basing the filtering on accelerator pedal position, torque response may be adjusted such that a driver experiences smaller driveline torque disturbances at lower accelerator pedal positions and greater driveline torque disturbances at higher accelerator pedal positions. Consequently, the driver may recognize fewer objectionable driveline torque disturbances. Method 600 proceeds to 624 after engine torque is commanded to the value based on filtered driver demand torque.

At 624, method 600 estimates the torque produced by the engine as described at 516 of FIG. 5. The estimated engine torque is then subtracted from the driver demand torque to determine the motor torque command. Thus, the commanded engine torque plus the commanded motor torque is equal to the driver demand torque. The commanded motor torque is output to the electric machine controller and method 600 proceeds to exit.

Thus, the method of FIGS. 5 and 6 provide for a powertrain operating method, comprising: during engine run-up from cranking speed to a desired speed before a driveline disconnect clutch coupled to an engine is fully closed, commanding an engine torque to first torque bounded by a lower limit and an upper limit, the lower limit and the upper limit based on an accelerator pedal position. The method further comprises commanding a motor torque to a driver demand torque during the engine run-up. The method includes where the upper limit is a torque that is a maximum of a driver demand torque and a second torque that is solely a function of accelerator pedal position. The method includes where the lower limit is a third torque that is solely a function of accelerator pedal position and different from the second torque. The method includes where the desired speed is a speed of a motor coupled to a transmission and a second side of a driveline disconnect clutch, and where the engine is coupled to a first side of the driveline disconnect clutch. The method includes where the driveline disconnect is fully closed when driveline disconnect clutch speed on an engine side of the driveline disconnect clutch is a same speed as driveline disconnect clutch speed on a motor side of the driveline disconnect clutch.

The method of FIGS. 5 and 6 also provides for a powertrain operating method, comprising: during engine run-up from cranking speed to a desired speed before a driveline disconnect clutch coupled to an engine is fully closed, commanding an engine torque to first torque bounded by a lower limit and an upper limit; commanding engine torque to a predetermined torque during closing of the driveline disconnect clutch; and commanding engine torque to a driver demand torque including commanding the engine to a filtered driver demand torque in response to the driveline disconnect clutch being fully closed. The method includes where the filtered driver demand torque includes a filter rate that is based on an accelerator pedal position. The method further comprises commanding a motor torque to a difference between the driver demand torque and an estimated engine torque in response to the driveline disconnect clutch being fully closed.

In some examples, the method includes where filtering the driver demand torque includes filtering the driver demand torque via a longer time constant at accelerator pedal positions less than a threshold. The method includes where filtering the driver demand torque includes filtering the driver demand torque via a shorter time constant at accelerator pedal positions greater than the threshold. The method includes where the predetermined torque is based on driveline disconnect clutch torque capacity. The method includes where filtering the driver demand torque includes filtering the driver demand torque via a rate limiting filter. The method includes where the lower limit and the upper limit are based on an accelerator pedal position.

Referring now to FIG. 7, an example plot of an engine torque rate limit based on accelerator pedal position is shown. The vertical axis represents engine torque rate of change limit (e.g., 20 N-m/second) and engine torque rate of change increases in the direction of the vertical axis arrow. The horizontal axis represents accelerator pedal position and accelerator pedal position increases from left to right.

In this example, the engine torque rate of change limit increases as accelerator pedal position increases and decreases as accelerator pedal position decreases. For example, a function represented by the plot of FIG. 7 may output a small engine torque rate limit (e.g., 10 N-m/second) at a smaller accelerator pedal position. The function may output a large engine torque rate limit (e.g., 300 N-m/second) at a large accelerator pedal position. The engine torque rate of change limit may be applied to the driver demand torque to adjust the engine torque command.

In this way, the accelerator pedal position may be used to control engine and motor torque response. Because a driver may expect larger torque disturbances at higher or greater accelerator pedal positions, engine torque and motor torque may be less filtered when accelerator pedal position is higher. On the other hand, because a driver may expect smaller torque disturbances at lower or smaller accelerator pedal positions, engine torque and motor torque may be more filtered when accelerator pedal position is smaller.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A powertrain operating method, comprising:
during engine run-up from cranking speed to a desired speed before a driveline disconnect clutch coupled to an engine is fully closed, commanding an engine torque to a first torque bounded by a lower limit and an upper limit, the lower limit and the upper limit based on an accelerator pedal position, where the upper limit is a torque that is a maximum of a driver demand torque and a second torque that is solely a function of accelerator pedal position.

2. The method of claim 1, further comprising commanding a motor torque to the driver demand torque during the engine run-up.

3. The method of claim 1, where the lower limit is a third torque that is solely a function of accelerator pedal position and different from the second torque.

4. The method of claim 1, where the desired speed is a speed of a motor coupled to a transmission and a second side of the driveline disconnect clutch, and where the engine is coupled to a first side of the driveline disconnect clutch.

5. The method of claim 1, where the driveline disconnect clutch is fully closed when driveline disconnect clutch speed on an engine side of the driveline disconnect clutch is a same speed as driveline disconnect clutch speed on a motor side of the driveline disconnect clutch.

6. A powertrain operating method, comprising:
during engine run-up from cranking speed to a desired speed before a driveline disconnect clutch coupled to an engine is fully closed, commanding an engine torque to a first torque bounded by a lower limit and an upper limit;
commanding engine torque to a predetermined torque during closing of the driveline disconnect clutch; and
commanding engine torque to a driver demand torque including commanding the engine to a filtered driver demand torque in response to the driveline disconnect clutch being fully closed.

7. The method of claim 6, where the filtered driver demand torque includes a filter rate that is based on an accelerator pedal position.

8. The method of claim 6, further comprising commanding a motor torque to a difference between the driver demand torque and an estimated engine torque in response to the driveline disconnect clutch being fully closed.

9. The method of claim 6, where filtering the driver demand torque includes filtering the driver demand torque via a longer time constant at accelerator pedal positions less than a threshold.

10. The method of claim 9, where filtering the driver demand torque includes filtering the driver demand torque via a shorter time constant at accelerator pedal positions greater than the threshold.

11. The method of claim 6, where the predetermined torque is based on a driveline disconnect clutch torque capacity.

12. The method of claim 6, where filtering the driver demand torque includes filtering the driver demand torque via a rate limiting filter.

13. The method of claim 6, where the lower limit and the upper limit are based on an accelerator pedal position.

14. A system, comprising:
an engine;
a motor/generator;
a disconnect clutch positioned in a powertrain between the engine and the motor/generator;
a transmission coupled to the motor/generator; and a controller including executable instructions stored in non-transitory memory for commanding an engine torque and a motor torque during engine starting to a time when motor torque is zero or less than zero and engine torque is equal to or greater than a driver demand torque, the engine torque commanded based on a rate filtered driver demand torque that reduces a rate of engine torque increase for accelerator pedal positions less than a threshold and increases the rate of engine torque increase for accelerator pedal positions greater than the threshold.

15. The system of claim 14, where the engine torque is commanded based on the rate filtered driver demand torque only after starting to close the disconnect clutch.

16. The system of claim 14, further comprising additional instructions to command motor torque to provide the driver demand torque during engine cranking and run-up to motor speed.

17. The system of claim 14, further comprising additional instructions to command motor torque to zero or less than zero in response to fully closing the disconnect clutch.

18. The system of claim 14, further comprising additional instructions to estimate engine torque based on engine speed and engine load.

19. The system of claim 18, further comprising additional instructions to adjust motor torque based on the estimate of engine torque.

* * * * *